United States Patent [19]

McKie

[11] 4,140,614
[45] Feb. 20, 1979

[54] INTERNAL CATHODIC PROTECTION OF PIPES

[76] Inventor: William M. McKie, Wheaton Aston, England

[21] Appl. No.: 836,040

[22] Filed: Sep. 23, 1977

Related U.S. Application Data

[62] Division of Ser. No. 651,160, Jan. 21, 1976, abandoned.

[30] Foreign Application Priority Data

Jan. 23, 1975 [GB] United Kingdom ............... 2901/75

[51] Int. Cl.² ........................................... C23F 13/00
[52] U.S. Cl. ................................................. 204/197
[58] Field of Search .................................. 204/196, 197

[56] References Cited

U.S. PATENT DOCUMENTS 1,705,197  3/1929  Mills ........................................ 204/197
3,347,768  10/1967  Clark et al. ............................ 204/196
3,794,574  2/1974  Fauth et al. ............................ 204/197

Primary Examiner—Howard S. Williams
Attorney, Agent, or Firm—Leydig, Voit, Osann, Mayer & Holt, Ltd.

[57] ABSTRACT

An anode arrangement for use in the internal cathodic protection of a pipe includes a hollow anode-carrier member to be connected along the length of the pipe and to form a continuation of the channel defined by that pipe and further includes an anode mounted in the recess of the carrier member, the anode being offset from, but communicating with, the channel of the pipe so that the anode lies substantially wholly within the recess and does not obstruct the flow in the pipe.

In a preferred construction the anode is mounted on a cover plate of the carrier member so that the anode can be removed from externally of the channel of the pipe.

5 Claims, 3 Drawing Figures

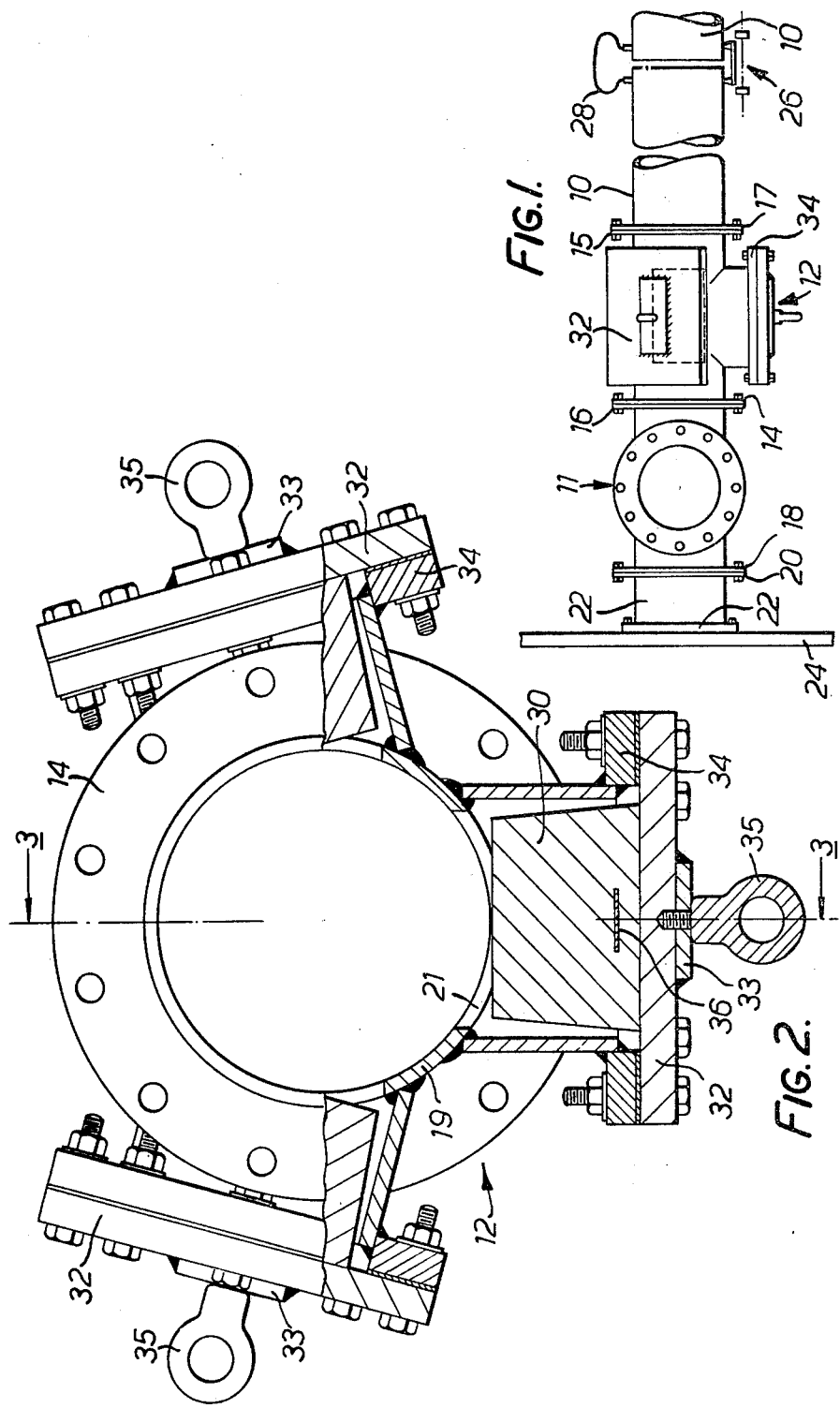

INTERNAL CATHODIC PROTECTION OF PIPES

RELATED APPLICATIONS

This application is a continuation of Ser. No. 651,160 filed Jan. 21, 1976 now abandoned in the name of William M. McKee.

BACKGROUND OF THE INVENTION

1. Field of the Invention

This invention relates to the corrosion protection of the internal surfaces of pipes, in particular to an arrangement for providing such protection.

2. Summary of the Prior Art

Protection against the corrosion of metals, more particularly iron and steel, has been provided successfully and at low cost by cathodic protection either by the use of sacrificial anodes or by using permanent anodes coupled to a potential source which is used to overcome and reverse the natural potential difference which is set up whenever a metal is immersed in an electrolyte such as sea water. Apparatus and systems have been evolved which satisfactorily protect ships, liquid-containing tanks, bridges and other structures and more recently the external surface of ducts and pipe lines has also been successfully protected.

However, wherever sea water is passed through pipe lines the problem of internal protection is acute and to give reasonable installed life under these circumstances it has been necessary to make the pipes substantially thicker than strength considerations would otherwise call for in order to avoid frequent and costly replacement. It has been found that 12 inches (30.48 cm.) diameter pipes of spun cast iron may corrode to a degree that they become unserviceable within one year or even substantially less time under certain conditions. Since the pipes are costly in themselves and the labour costs of replacing the pipes and in certain cases the apportioned costs of taking a ship out of commission are at least as high, the need for providing effective and inexpensive internal protection is fully apparent. The ever-increasing use of very large size oil tankers has emphasized this problem since such tankers have extensive pipe work.

The main pipes of such tankers can be divided into three categories. One set of pipes (cargo lines) is uses to communicate with the tanks for the purpose of taking on and discharging the main bulk of the cargo from these tanks and subsequently ballasting operations within these tanks. Another pipe, (ballast line) is primarily used for loading and unloading sea water ballast from the permanent ballast tanks. A third set of pipes (stripping lines) is usually used for removing residual oil or ballast. The stripping lines are more likely to be subject to corrosion since the residue left in the tanks often has a high proportion of sea water and, of course, the ballast lines also suffer from the same problem. On some vessels the cargo/stripping lines are combined and structurally are formed by a duct which is defined by structure of the vessel. Such ducts also require protection.

Problems similar to those encountered in sea-going tankers and other vessels also occur in offshore rigs and pipelines where sea water is sometimes static within pipes for long periods. Recent experience has shown that the rate of corrosion can be very high under certain circumstances, and replacement costs can be far higher than for a sea-going vessel which can be conveniently docked. In all pipe lines roughness causes reduction in capacity and it is therefore essential that flow losses should be kept to a minimum since otherwise the size of pipe for a given flow rate needs to be increased.

It is an object of the present invention to provide an anode arrangement for a cathodic protection system which minimises the flow disturbance within the pipe.

SUMMARY OF THE INVENTION

According to the present invention, there is provided an anode arrangement for use in the internal cathodic protection of a pipe, said arrangement comprising a hollow anode-carrier member to be connected to the pipe to form a continuation of the channel provided by that pipe and an anode mounted in a recess of the carrier member offset from, but communicating with, said channel continuation so that the anode lies substantially within the said recess.

According to the present invention there is further provided an anode arrangement for use in the internal cathodic protection of a pipe, said arrangement comprising a hollow anode-carrier to be connected to the pipe and having an internal cross-sectional profile substantially equal to that of the pipe said carrier having a plurality of rectangular cross-section recesses leading into its interior hollow space, and a plurality of anodes mounted in a fluid-tight manner one in each of said recesses and a plurality of cover plates accessible for insertion or removal from externally of the anode carrier and each carrying one said anode.

Although the invention is of particular value in pipes of steel or spun cast iron it is equally applicable to the internal protection of other pipes or ducts of various diameters and metals liable to corrosion.

BRIEF DESCRIPTION OF THE DRAWINGS

FIG. 1 illustrates a length of pipe to be protected, its connections to a bulkhead of a vessel and the situation of an anode carrier in accordance with the invention in relation to the other parts;

FIG. 2 is a half end elevation and a half cross-section through the anode carrier of FIG. 1 the section being taken on the line 2—2 of FIG. 3.

DESCRIPTION OF THE PREFERRED EMBODIMENT

Figure 3:
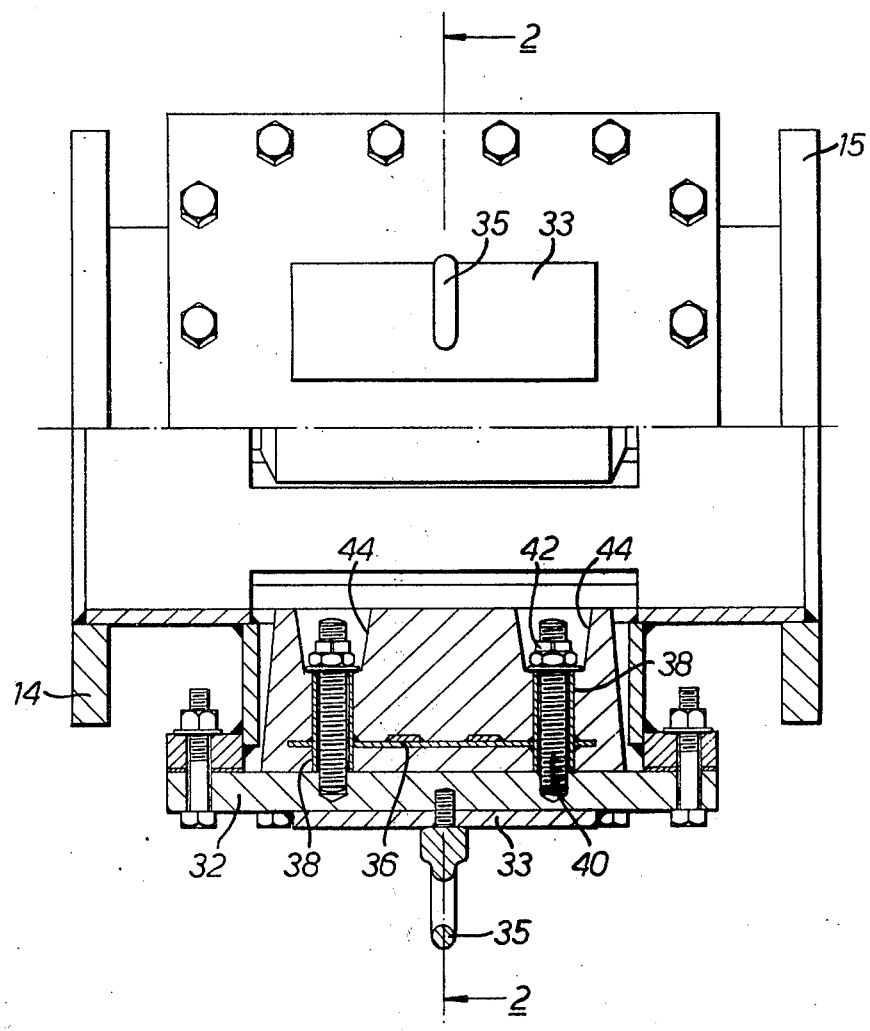
FIG. 3 is a half side elevation and a half longitudinal section of the anode carrier of FIG. 2, the section being taken on the line 3—3 of FIG. 2.

Referring first to FIG. 1, a fragment of pipe 10 of a stripping line of a sea-going vessel of spun cast iron is shown but it will be appreciated that cast iron is currently used largely because of the widely-held belief that it is less liable to corrosion than steel; by employing the arrangement, in accordance with the invention conventional mild steel pipe can be used. The pipe 10 is directly connected to an anode-carrier member 12 embodying the invention which is flanged at both ends and this is, in turn, connected by one flange 14 to a corresponding flange 16 of a tee-piece 11 for the loading and unloading of residual oil and the tee-piece is secured by its other flange 18 to one flange 20 of a short connecting piece 22 which is secured to a bulkhead 24 of the vessel. The other flange 15 of the carrier is bolted to a flange 17 of the pipe 10. Stripping lines are more prone to corrosion failure than cargo or ballast lines but the carrier can also be incorporated to advantage in the latter.

Conventionally, lengths of pipe are connected by flexible couplings of various designs which enable limited degrees of misalignment and movement to be accommodated. Details of this coupling 26 are not relevant to the present invention and it has therefore been shown only diagrammatically. However, it is important that individual pipe lengths should be electrically fully bonded together and this can be effected for example by studs welded by capacitance welding to the outside of adjacent ends to two pipe lengths and the studs are connected by heavy strapping 28 to keep the electrical resistance to a minimum. Again, the precise method of bonding does not form the subject of the present invention and any conventional device used for the same purpose in the external protection of pipes will be suitable.

Cathodic protection of a metal surface depends upon the flow of electrical current from an anode, into the liquid electrolyte and onto the surface of the metal in contact with the liquid electrolyte thereby achieving and maintaining particular levels of electrical potential between the metal surface and the liquid electrolyte. The achievement of these levels of potential, the magnitude of which are generally accepted and their maintenance is largely dependent upon an electro-chemical phenomenon termed "polarisation".

Polarisation is a time-dependent change in the metal surface/liquid electrolyte interface; its nature is complex but may be considered, in outline, to involve the formation of concentration gradients of ions soluble in the liquid electrolyte adjacent to the metal surface, the deposition of certain ions from the liquid electrolyte on the metal surface and the metal surface and the formation of a film of hydrogen immediately adjacent the surface.

All these factors combine to provide an electrochemical barrier termed "the polarisation barrier" which reduces the current required to maintain the protective levels of electrical potential and stop corrosion. This polarisation barrier will, however, be removed when there is a flow of liquid such as sea water.

It has generally been assumed that under conditions of liquid flow, cathodic protection extends no more than three times the pipe diameter from the anode. While this may well be true, the system and method herein described rely upon the fact that in many pipe lines more particularly those employed in tankers, stagnation conditions are operative for a large part of the life of the pipe and flow takes place in stripping, ballast and cargo lines only when the vessel is either loading or unloading or is undergoing some operation at sea, such as tank cleaning. Thus, the applicants have been the first to recognise that although cathodic protection is not available for the whole of the life of the pipe it will be available for as much as 90% of that time and such protection will have an effect in prolonging the useful life of the pipe.

Further it is desirable that there should be no restriction in the effective cross-section of the pipe since otherwise disturbance of the flow might cause cavitation and other undesirable effects which might cancel out the benefits of cathodic protection.

The anode carrier 12 illustrated in greater detail in FIGS. 2 and 3 incorporates three anodes 30 each of a shape and form analogous to the pole pieces of a dynamo-electric machine. Each anode 30 is rigidly secured to a cover plate 32 so that it can readily be removed, if necessary by crew members, and replaced by a fresh anode when the original is no longer effective. No access is required to the inside of the pipe or carrier. The anodes 30 are of zinc or a special zinc alloy for example an alloy marketed by the applicants known as B.K.L. No. 1 alloy (or Mil. Spec. 18001 H), or of other anodic material, of which there are many alternatives.

Three of the covers 32 which support the individual anodes 30 are bolted to respective flanges 34 of the anode carrier 12 and, as will be apparent from FIG. 2, the anodes do not obtrude into the hollow cross-section of the carrier 12 and hence of the pipe length 10. Each cover plate has welded thereto a small plate 33 which carries an eye bolt 35.

The anode carrier illustrated is intended for a 12 inch (30.48 cm.) pipe but the same construction can be employed in pipes of other diameters when the number of anodes may well be reduced, for smaller size pipes and increased to say eight anodes for a pipe of 24 inches diameter. For larger sizes, two anodes or more are mounted on each cover.

As illustrated one anode is mounted on the vertical axis below the longitudinal centre line and the other two anodes are mounted with their centre lines above the longitudinal centre line and with these centre lines inclined at a small angle of 15° to 25° to the horizontal plane passing through the longitudinal centre line.

Alternatively the other two anodes are mounted similarly but below the longitudinal centre line. In another arrangement the other two anodes are mounted on the horizontal centre line.

As is conventional in all anodes used for cathodic protection purposes, the zinc or other sacrificial metal is mounted on a steel core 36 to ensure, as far as possible, that pieces of the anode do not break away and mix with the liquid which could clearly have damaging effects on pumps and valves. By employing the anode carrier in accordance with the invention the risk that such parts will become detached is substantially reduced since at no time is any part of the anode directly placed in the flow within the pipe line. Nevertheless, the steel core 36 is provided which is configured that the zinc keys to the skeleton structure. The core is welded to sleeves 38 which accommodate studs 40 by which the anode is secured to the corresponding cover plate 32 with the aid of self-locking nuts 42. The length of the studs is such they they lie wholly within recesses 44 in the anode material.

The weight of the anodes is determined by conventional cathodic protection practice and the size and available surface area will preferably be sufficient to produce an applied current density of 2 to 10mA./ft. The internal face of each anode is shown as being flat, but it may be concave to match the internal face of the body 19.

The anode carrier in accordance with the invention enables ready replacement of the anodes without the need to dismantle a pipe line and can be effected manually without the need for hoisting gear.

For such a pipe line measuring 180 meters two anode carriers would normally be employed, evenly distributed along the pipe length and for a 100 meter length one anode carrier would be employed at the centre. In more general terms it is believed that for 28 inch pipes a length equivalent of up to 500 diameters will be protected within two days from installation. The time delay to achieve protection for smaller pipes will, however, be greater.

Conventionally, when a ballast line or a stripping line has been inactive the pipe has been kept empty with a view to reducing corrosion. However, it is impossible to ensure that all sea water drains fully and under these conditions and particularly in warm climates the corrosion rate is as rapid or even more rapid than with a full pipe which has no protection. The system as claimed in Serial No. 651,160 requires that the pipe should be kept filled at all times. The presence of the sea water electrolyte ensures that cathodic protection is maintained and corrosion is kept to very low limits.

Experiments have shown that by the employment of cathodic protection the corrosion rate of a 12 inch diameter pipe containing sea water can be reduced very substantially and approximately to 20% of the rate under operational conditions with no protection.

In an alternative, unillustrated embodiment of anode arrangement, a structure similar to that formed by the plates 23, 25, 27 and 29 is welded directly to a length of pipe-line around an aperture and the cover plate of an anode is bolted to a flange at the outer ends of the plates. This alternative is particularly suitable for use in newly-constructed ships and oil rigs, and the system and method remain the same.

I claim:

1. An anode arrangement for use in the cathodic protection of the internal surface of a pipe, said arrangement comprising a hollow anode-carrier member connected to the pipe to form a continuation of the channel provided by that pipe,
   an anode mounted in a recess of the carrier member offset from, but communicating with, said channel continuation so that the anode lies substantially within the said recess and outside the flow path through the anode-carrier member, and means securing the anode in the recess which means are accessible from externally of the anode-carrier member whereby the anode can be removed from the carrier without disturbing the carrier member in its location in the pipe.

2. An arrangement according to claim 1, wherein the securing means comprises a flange bounding said recess,
   a cover plate mounting the anode, and
   means accessible from externally of the carrier member securing the cover plate to said flange.

3. An arrangement according to claim 2 wherein the anode-carrier member has a plurality of said recesses and a corresponding number of said anodes and said cover plates.

4. An arrangement according to claim 2 wherein the anode has a reinforcing cord and apertures for receiving the means to secure the anode to the corresponding cover plate, each said aperture being lined with a sleeve rigid with the reinforcing core.

5. An anode arrangement for use in the internal cathodic protection of a pipe, said arrangement comprising
   a hollow anode-carrier connected to the pipe and having an internal cross-sectional profile substantially equal to that of the pipe,
   said carrier having a plurality of rectangular cross-section recesses leading into its interior hollow space,
   a plurality of anodes mounted in a fluid-tight manner one in each of the said recesses, and
   a plurality of cover plates accessible for mounting or removal from externally of the anode carrier and each carrying one said anode, whereby each anode can be removed from the carrier without disturbing the connections of the carrier to the pipe.

* * * * *